Figure 11:
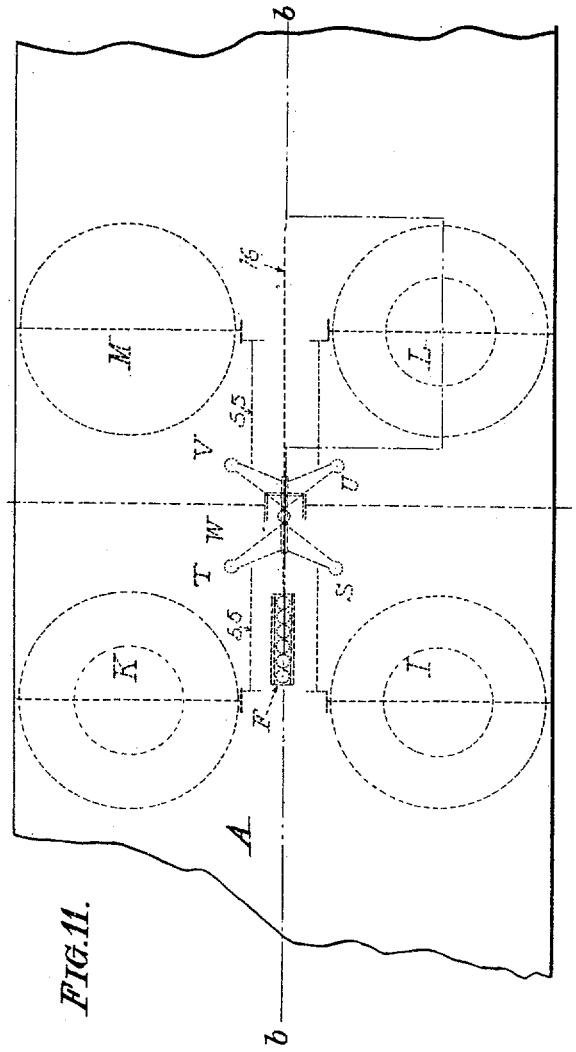

R. SCHMIECHEN.
MEANS FOR MAINTAINING THE EQUILIBRIUM OF AIRSHIPS AND OTHER FLYING MACHINES.
APPLICATION FILED SEPT. 13, 1909.
977,556.
Patented Dec. 6, 1910.
5 SHEETS—SHEET 1.
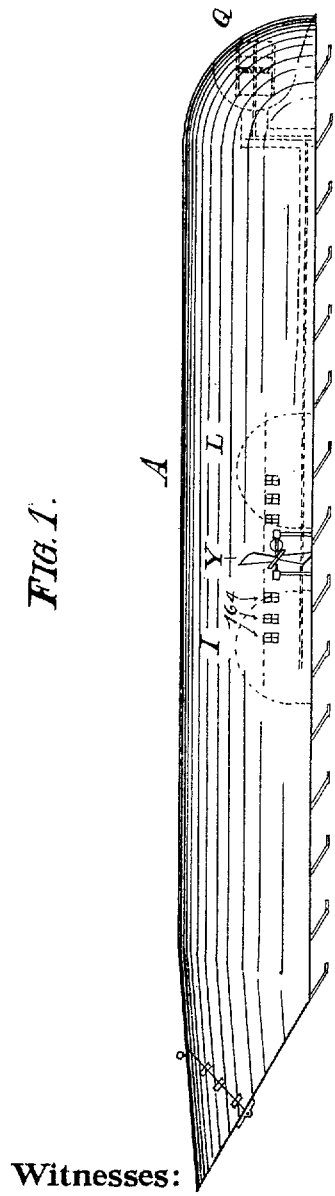
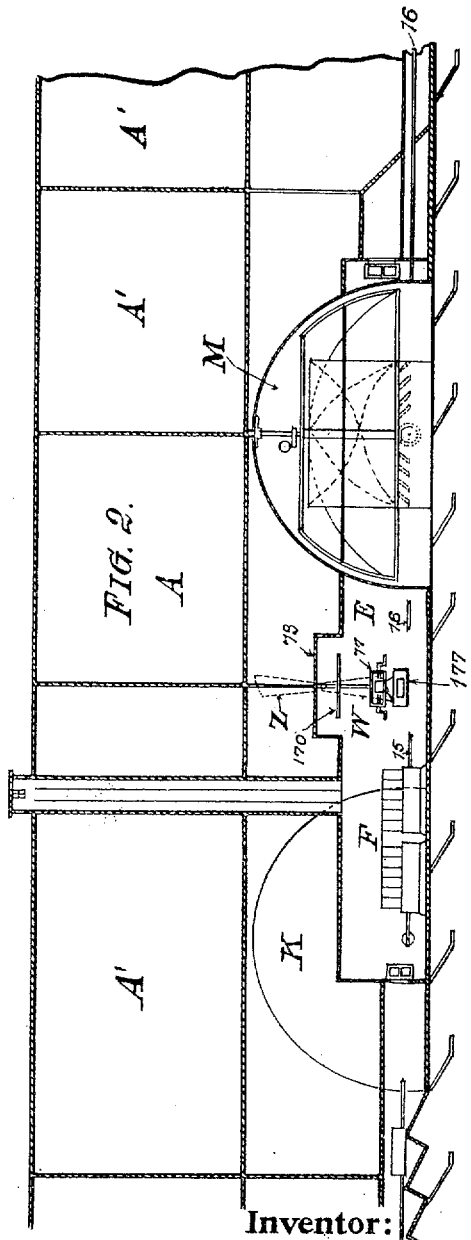
Witnesses:
C. B. Knudsen
A. S. Peterson.
Inventor:
Reinhold Schmiechen,
By Michael J. Stark & Sons
Attorneys.

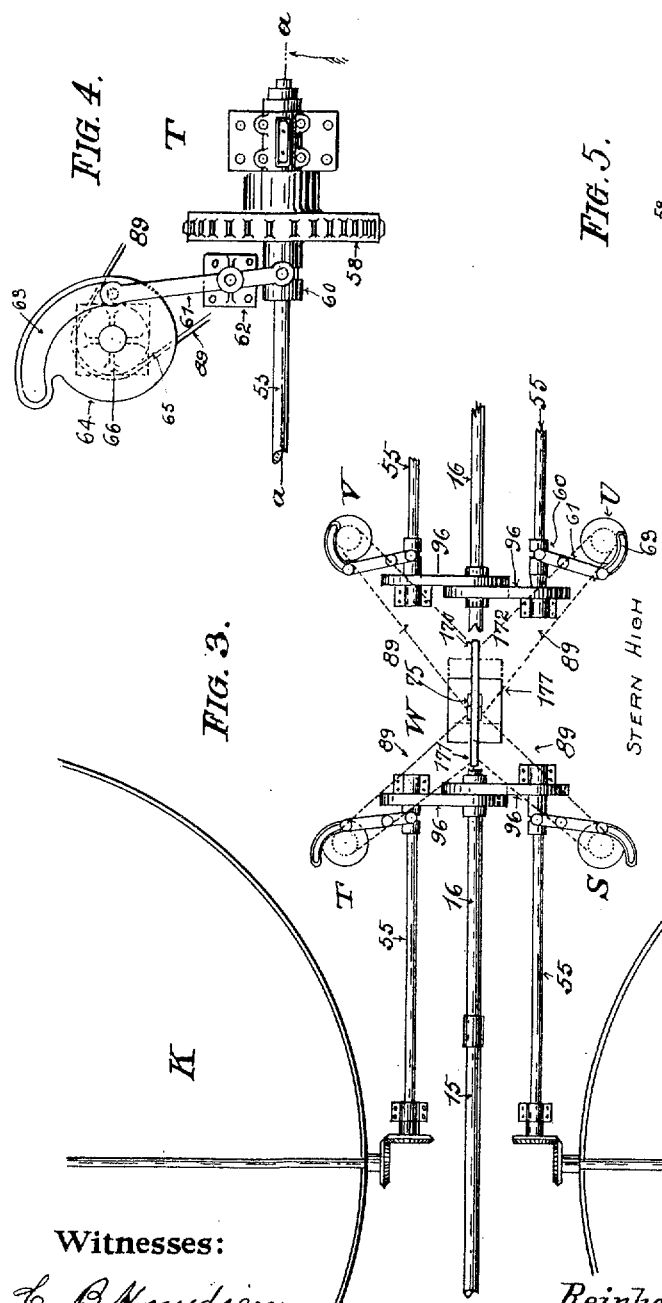

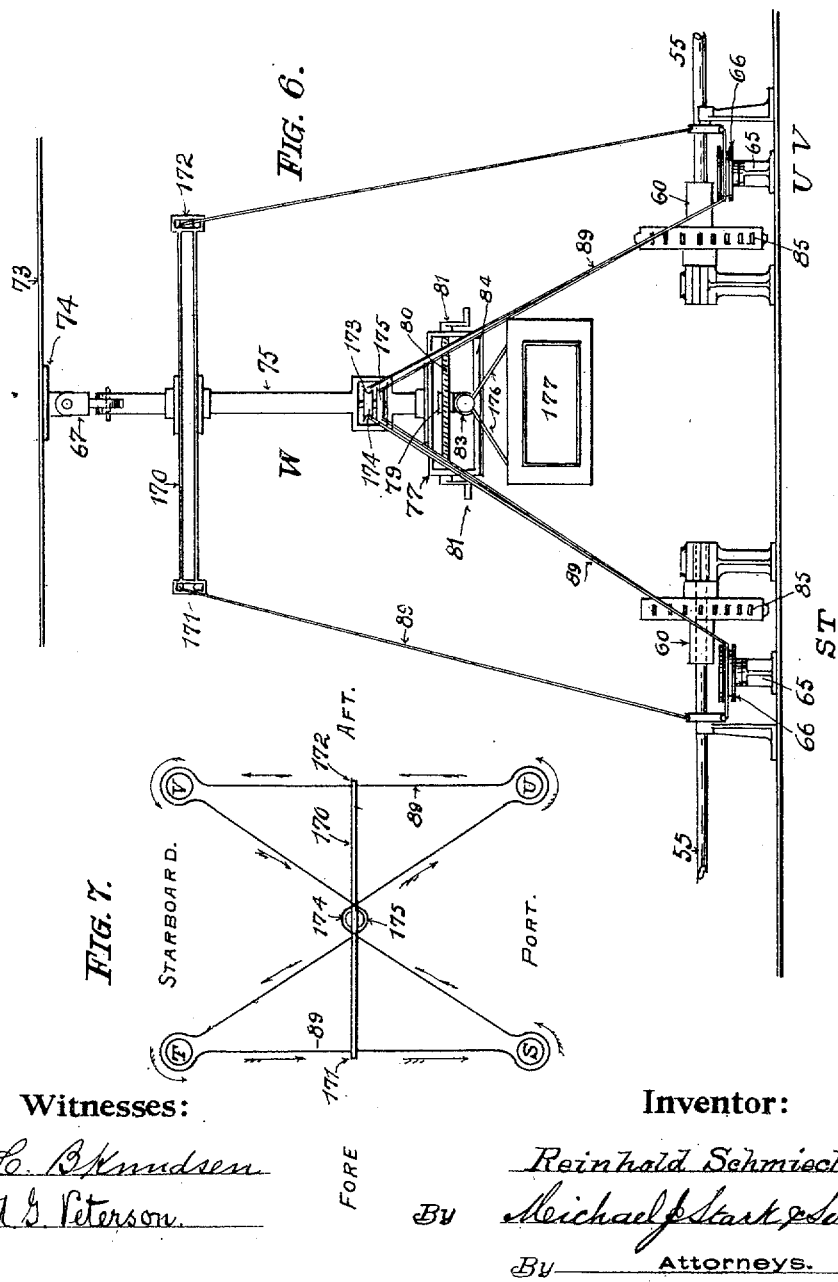

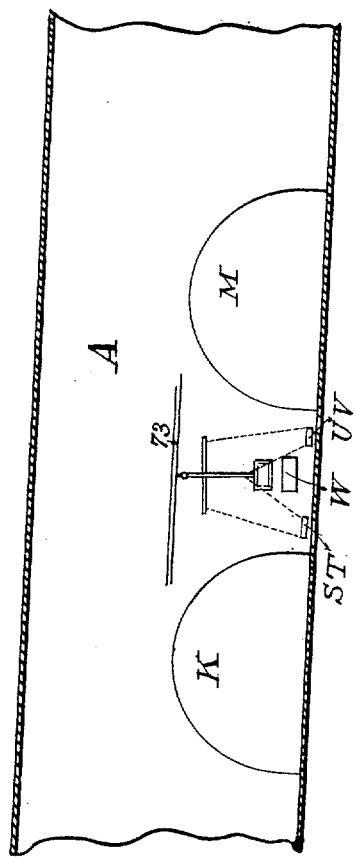
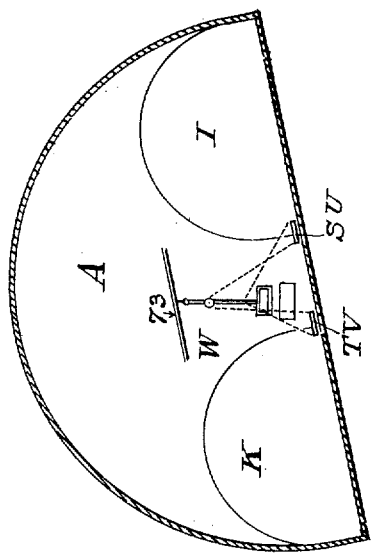
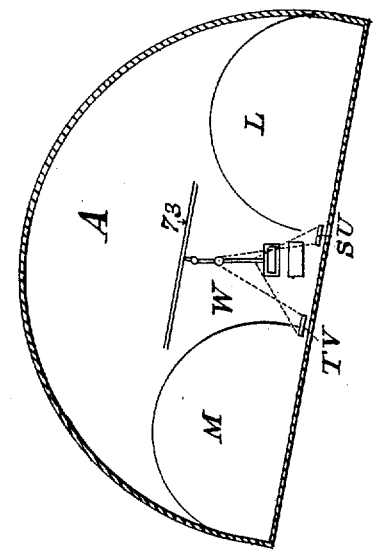

R. SCHMIECHEN.
MEANS FOR MAINTAINING THE EQUILIBRIUM OF AIRSHIPS AND OTHER FLYING MACHINES.
APPLICATION FILED SEPT. 13, 1909.

977,556.

Patented Dec. 6, 1910.

5 SHEETS—SHEET 5.

Witnesses:
C. B Knudsen
A. G. Peterson

Inventor:
Reinhold Schmiechen,
By Michael J. Stark & Sons,
Attorneys.

UNITED STATES PATENT OFFICE.

REINHOLD SCHMIECHEN, OF LEDYARD, IOWA.

MEANS FOR MAINTAINING THE EQUILIBRIUM OF AIRSHIPS AND OTHER FLYING-MACHINES.

977,556.  Specification of Letters Patent.  Patented Dec. 6, 1910.

Application filed September 13, 1909. Serial No. 517,459.

*To all whom it may concern:*

Be it known that I, REINHOLD SCHMIECHEN, a citizen of the United States, and a resident of Ledyard, in the county of Kossuth and State of Iowa, have invented certain new and useful Improvements in Means for Maintaining the Equilibrium of Airships and other Flying-Machines; and I do hereby declare that the following description of my said invention, taken in connection with the accompanying sheets of drawings, forms a full, clear, and exact specification, which will enable others skilled in the art to which it appertains to make and use the same.

This invention has general reference to airships and aeroplanes; and its object is to provide for ready, serviceable, and efficient, automatically - operating, means for maintaining the equilibrium of airships and other flying machines. To attain this object, I construct this mechanism as shown in the drawings already referred to, and hereinafter fully set forth and described, the novelty of my said invention being pointed out in the claims.

Figure 12:
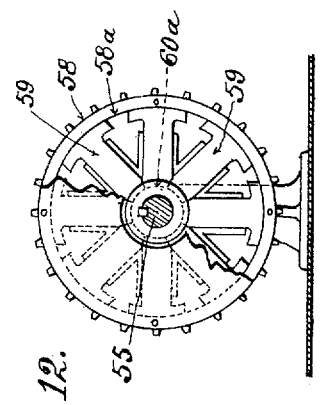

In the drawings Figure 1 is a side-view of an airship in which my equilibrium-maintaining means are installed. Fig. 2 is a longitudinal sectional elevation of the amidship-portion of an airship drawn on line *b b* of Fig. 11 illustrating details of construction. Fig. 3 is a diagrammatic plan of the engine-room of an airship showing the location of the various devices employed therein for operating the propelling mechanism and the equilibrium-maintaining means. Fig. 4 is a plan, and Fig. 5 a sectional elevation, on line *a a* of Fig. 4 of one of the friction-clutches detached. Fig. 6 is an elevation of the equilibrium-maintaining mechanism. Fig. 7 is a diagrammatic plan of the equilibrium-maintaining device, details of construction being omitted. Fig. 8 is a longitudinal sectional elevation of a fragment of an air ship showing the same in an inclined position. Figs. 9 and 10, are transverse-sectional elevations of a portion of an airship showing the same in different tilted positions. Fig. 11 is a plan of the midship portion of the airship, showing, in dotted lines, the main features of this invention, the propellers on the sides of the ship's body being omitted. Fig. 12 is a side view of the friction-clutch sprocket wheel part of the cover thereof being removed to disclose details of construction.

Like parts are designated by corresponding symbols and characters of reference in all the figures.

The letter A in these drawings designates the body of an airship. It is assumed to be a structure, heavier than air and of any desired contour or outline, my invention being applicable to many, if not all, of the various types of airships and aeroplanes. It is also assumed that this body A is divided, by means of longitudinal and transverse bulkheads into a considerable number of gas-tight cells A′, adapted to hold gas, or supplied with a number of individual and separate containers for, preferably hydrogen gas. In this body, or suspended therefrom if desired, provisions are made for the necessary internal - combustion motors F by means of which the propelling means are actuated. These propelling means may comprise side-propellers Y, Z, as shown in Figs. 1 and 2, and stern-propellers Q, Fig. 1, for the forward-propulsion of the airship, and vertically-lifting propellers I, K, L, and M, of any desired specific construction. These various propellers are all connected by suitable mechanism and shafting with the motors F, there being included in this mechanism friction-clutches, by means of which the various propellers may be started, stopped and reversed and caused to operate with greater or lesser speed to accomplish the result desired, without manipulating the motors F or interfering with their normal operation.

S, T, U, and V, are four friction-clutches located approximately in the center of the airship, and connected with the vertically-lifting propellers I, K, L, and M, by four shafts 55, and with the main transmission-shaft 16 which is suitably coupled to the motor shaft 15, by means of sprocket-wheels 58 and drive-chains 96 or any other suitable mechanism. Each of these friction-clutches has suitable means whereby they may be independently and conjointly connected with said shafts 55, and disconnected therefrom, automatically, by a pendulum W, suspended from an overhead member 73, of the airship, by means of a plate 74, and an intermediary link 67, to which a rod 75 is suitably pivoted. To this rod 75 there is secured, near its upper end, a longitudinal bar 170, having at its outer ends guide-sheaves 171, 172, and near its lower end an opening 173 within which there are journaled two guide-sheaves 174, 175, an endless rope 89 being passed from said pendulum and its bar 170 in the following manner: Starting from the sheave 171 on the beam 170 this rope passes downwardly to the friction-clutch S, then back to the sheave 174 on the pendulum 75 and thence diagonally over to the friction-clutch U, thence upwardly to the sheave 172 on the arm 170 downwardly to the friction-clutch V, and then again upwardly to the sheave 175 and downwardly to the friction clutch T, to return to the sheave 171 at the starting point on the beam 170. Thus, should the pendulum swing aft on account of the bow of the ship rising, and the longitudinal bar 170 rise at the end where the sheave 171 is located, the endless rope will pull the friction-clutch mechanism S, T, in a direction to slightly disengage these clutches while the friction-clutches U, V, are slightly tightened, it being understood that normally, these friction-clutches are not fully engaged. If the ship rises at the stern, a contrary movement of the several friction-devices takes place, this position of the parts being illustrated in Fig. 8, while, should the ship lean over toward port as shown in Fig. 9 so that the starboard side is slightly higher, the pendulum will swing toward port, and the endless rope will cause the friction devices T, V, to slacken and the friction-clutches S, U, to tighten; and, should the ship lean in the opposite direction, as illustrated in Fig. 10 a contrary movement of the friction devices takes place. It will, hence, be understood that should the ship rise at the stern and also lean to starboard or port, the pendulum will swing accordingly, and the corresponding friction-clutch devices will slacken, and the others to tighten accordingly, a slackening of a friction device causing a corresponding decrease in the speed of the respective vertically-lifting propellers, while a tightening thereof will cause an increase of its speed. These friction-devices may be of various construction, and in order to illustrate one such construction I refer to Figs. 4 and 5, in which such a device is shown in detail, and in which upon the shaft 55 there is mounted the combined sprocket-wheel and friction-clutch disk 58, having friction-bars 59, of usual construction. Upon this shaft 55 there is also splined, a sliding, tapering, clutch-sleeve 60 adapted to engage the friction-bars 59 when laterally moved upon the shaft 55 by a forked lever 61. This lever is fulcrumed upon a standard 62, Figs. 4 and 5, and it engages with its outer end a cam-groove 63, located in a cam-disk 64, which cam-disk is mounted, and oscillates, upon a standard 65. This cam-disk 64 is formed, preferably integral, with a chain-wheel or rope-sheave 66, around which the chain or rope 89, heretofore mentioned, passes so that when this sheave is rotated, it will rotate the cam-disk 64 and thereby actuate the lever 61 and move the clutch-block 60 laterally upon the shaft 55. This clutch-block 60 has a long, slightly tapering, body 60$^a$, the tapering end engaging the friction-bars 59 and causing them to move radially in the disk 58 when said clutch-block 60 is moved laterally upon the shaft 55, thereby causing the friction-bars 59 to impinge upon the inner surface of its projecting rim 58$^a$ with greater or lesser force and thereby cause the faster and slower rotation of the shaft 55 in an obvious manner.

In the diagrammatic plan Fig. 7, I have outlined the run of the endless chain 89 without regard to the exact position of the friction-clutch devices S, T, U, and V, and the details of construction thereof, it being evident that suitably-located guiding sheaves, not shown, will be introduced to lead the endless rope 89 fairly to the various sheaves. When it is desired to rise or descend, with the ship in an inclined position, or when the ship is not evenly loaded, so that the pendulum will not hang perpendicular, I resort to the means shown in Fig. 6, wherein a frame 77 is shown which is attached to the lower end of the pendulum-rod 75. In this frame there is journaled a screw 80, the ends of which project from the frame 77 and have cranks 81, by means of which the screw 80 may be rotated. Upon this screw there is a nut 79 having at its lower end a flanged wheel 83 engaging a rail, 84, which rail may be the lower member of the frame 77. From this nut 79 there is suspended, by rods 176, or other suitable means a receptacle 177, which serves the purpose of a weight to the pendulum rod 75 and which receptacle is designed to hold for storage, tools, and other paraphernalia, carried on an airship and which are not required when the airship is afloat. By shifting this weight either forward or backward, by manipulating the screw 80 in the proper direction, the center of gravity of the pendulum is moved correspondingly and thereby the friction devices S, T, and V, U, influenced accordingly.

I have heretofore stated that the pendulum of the equilibrium-maintaining device swings back and forth or sidewise toward port and starboard, or a compound movement of these movements. This, however, is only figuratively-speaking the case, the pendulum remaining, as a matter of fact, always perpendicular unless its center of gravity is shifted by the movement of the weight suspended therefrom, and the control of the friction devices is caused by the changes in the position of the airship acting upon said friction devices through the pendulum which always remains in its vertical position.

Having thus fully described this invention, I claim as new and desire to secure to me by Letters Patent of the United States—

1. In an airship, means for maintaining the equilibrium thereof while afloat, said means including, in combination, a pendulum; propellers, adapted to move said airship when afloat; motors, adapted to rotate said propellers, and means, adapted to govern said propellers, said latter means including an endless drive connecting said pendulum with said governing means.

2. In an airship, means for maintaining the equilibrium thereof while afloat, said means including, in combination, a pendulum; vertically-lifting propellers, adapted to move said airship when afloat; motors, adapted to rotate said vertically-lifting propellers, and means, adapted to govern said vertically-lifting propellers, said latter means including an endless drive connecting said pendulum with said governing means.

3. In an airship, means for maintaining the equilibrium thereof while afloat, said means including, in combination, a pendulum; propellers, adapted to move said airship when afloat; motors, adapted to rotate said propellers; means, adapted to govern the speed of said propellers, said means including an endless drive, connecting said pendulum with said means that govern the speed of said propellers.

4. In an airship, means for maintaining the equilibrium thereof while afloat, said means including, in combination, a pendulum; vertically-lifting propellers, adapted to move said airship when afloat; motors, adapted to rotate said vertically-lifting propellers; means, adapted to govern the speed of said vertically-lifting propellers, and means, including an endless drive, connecting said pendulum with said means that govern the speed of said vertically-lifting propellers.

5. In an airship, means for maintaining the equilibrium thereof while afloat, said means including, in combination, a pendulum; propellers adapted to move said airship when afloat; motors, adapted to rotate said propellers, and friction devices, adapted to govern said propellers, said latter devices including an endless drive connecting said pendulum with said friction-devices.

6. In an airship, means for maintaining the equilibrium thereof while afloat, said means including, in combination, a pendulum; vertically-lifting propellers, adapted to move said airship when afloat; motors, adapted to rotate said propellers, and friction-devices, adapted to govern said vertically-lifting propellers, said latter devices including an endless drive connecting said pendulum with said friction devices.

7. In an airship, means for maintaining the equilibrium thereof while afloat, said means including, in combination, a pendulum; propellers, adapted to move said airship when afloat; motors, adapted to rotate said propellers; and friction-devices, adapted to govern the speed of said propellers, said friction-devices including an endless drive connecting said pendulum with said friction-devices.

8. In an airship, means for maintaining the equilibrium thereof while afloat, said means including, in combination, a pendulum; vertically-lifting propellers, adapted to move said airship when afloat; motors, adapted to rotate said vertically-lifting propellers, and friction-devices, adapted to govern the speed of said vertically-lifting propellers, said friction devices including an endless drive connecting said pendulum with said friction-devices.

9. In an airship, means for maintaining the equilibrium thereof while afloat, said means including, in combination, a pendulum; means on said pendulum for shifting its center of gravity; propellers adapted to move said airship when afloat; motors adapted to rotate said propellers, and means connected with said pendulum and adapted to govern said propellers, said propellers being independently and conjointly operative.

10. In an airship, means for maintaining the equilibrium thereof while afloat, said means including, in combination, a pendulum; means on said pendulum for shifting its center of gravity; vertically-lifting propellers, adapted to move said airship when afloat; motors, adapted to rotate said propellers, and means, connected with said pendulum and adapted to govern said vertically-lifting propellers, said vertically-lifting propellers being independently and conjointly operative.

11. In an airship, means for maintaining the equilibrium thereof while afloat, said means including, in combination, a pendulum; means on said pendulum for shifting its center of gravity; propellers, adapted to move said airship when afloat; motors, adapted to rotate said propellers, and means, connected with said pendulum and adapted to govern the speed of said propellers, said propellers being independently and conjointly operative.

12. In an airship, means for maintaining the equilibrium thereof while afloat, said means including, in combination, a pendulum; means on said pendulum for shifting its center of gravity; vertically-lifting propellers, adapted to move said airship when afloat: motors adapted to rotate said vertically-lifting propellers, and means, connected with said pendulum and adapted to govern the speed of said vertically-lifting propellers, said vertically-lifting propellers being independently and conjointly operative.

13. In an airship, means for maintaining the equilibrium thereof while afloat, said means including, in combination, a pendulum; means on said pendulum for shifting its center of gravity; propellers adapted to move said airship when afloat; motors adapted to rotate said propellers, and friction-devices connected with said pendulum and adapted to govern said propellers, said propellers being independently and conjointly operative.

14. In an airship, means for maintaining the equilibrium thereof while afloat, said means including, in combination, a pendulum; means on said pendulum for shifting its center of gravity; vertically-lifting propellers adapted to move said airship when afloat; motors, adapted to rotate said vertically-lifting propellers, and friction-devices, connected with said pendulum and adapted to govern said vertically-lifting propellers, said vertically-lifting propellers being independently and conjointly operative.

15. In an airship, means for maintaining the equilibrium thereof while afloat, said means including, in combination, a pendulum; means on said pendulum for shifting its center of gravity; propellers adapted to move said airship when afloat; motors adapted to rotate said propellers, and friction-devices connected with said pendulum and adapted to govern the speed of said propellers, said propellers being independently and conjointly operative.

16. In an airship, means for maintaining the equilibrium thereof while afloat, said means including, in combination, a pendulum; means on said pendulum for shifting its center of gravity; vertically-lifting propellers adapted to move said airship when afloat; motors, adapted to rotate said vertically-lifting propellers, and friction-devices, connected with said pendulum and adapted to govern the speed of said vertically-lifting propellers, said vertically-lifting propellers being independently and conjointly operative.

17. In an airship, means for maintaining the equilibrium thereof while afloat, said means including, in combination, a pendulum; means on said pendulum for shifting its center of gravity; propellers adapted to move said airship when afloat; motors adapted to rotate said propellers, and means connected with said pendulum and adapted to govern said propellers, said latter means including an endless drive, said propellers being independently and conjointly operative.

18. In an airship, means for maintaining the equilibrium thereof while afloat, said means including, in combination, a pendulum; means on said pendulum for shifting its center of gravity; vertically-lifting propellers, adapted to move said airship when afloat; motors, adapted to rotate said propellers, and means, connected with said pendulum and adapted to govern said vertically-lifting propellers, said latter means including an endless drive, said vertically-lifting propellers being independently and conjointly operative.

19. In an airship, means for maintaining the equilibrium thereof while afloat, said means including, in combination, a pendulum; means on said pendulum for shifting its center of gravity; propellers, adapted to move said airship when afloat; motors, adapted to rotate said propellers, and means, connected with said pendulum and adapted to govern the speed of said propellers, said latter means including an endless drive, said propellers being independently and conjointly operative.

20. In an airship, means for maintaining the equilibrium thereof while afloat, said means including, in combination, a pendulum; means on said pendulum for shifting its center of gravity; vertically-lifting propellers, adapted to move said airship when afloat; motors adapted to rotate said vertically-lifting propellers, and means, connected with said pendulum and adapted to govern the speed of said vertically-lifting propellers, said latter means including an endless drive, said vertically-lifting propellers being independently and conjointly operative.

21. In an airship, means for maintaining the equilibrium thereof while afloat, said means including, in combination, a pendulum; means on said pendulum for shifting its center of gravity; propellers adapted to move said airship when afloat; motors adapted to rotate said propellers, and friction-devices connected with said pendulum and adapted to govern said propellers, said friction-devices including an endless drive, said propellers being independently and conjointly operative.

22. In an airship, means for maintaining the equilibrium thereof while afloat, said means including, in combination, a pendulum; means on said pendulum for shifting its center of gravity; vertically-lifting propellers adapted to move said airship when afloat; motors, adapted to rotate said vertically-lifting propellers, and friction-devices connected with said pendulum and adapted to govern said propellers, said friction-devices including an endless drive, said vertically-lifting propellers being independently and conjointly operative.

23. In an airship, means for maintaining the equilibrium thereof while afloat, said means including, in combination, a pendulum; means on said pendulum for shifting its center of gravity; propellers adapted to move said airship when afloat; motors adapted to rotate said propellers, and friction-devices connected with said pendulum and adapted to govern the speed of said propellers, said friction-devices including an endless drive, said propellers being independently and conjointly operative.

24. In an airship, means for maintaining the equilibrium thereof while afloat, said means including, in combination, a pendulum; means on said pendulum for shifting its center of gravity; vertically-lifting propellers adapted to move said airship when afloat; motors, adapted to rotate said vertically-lifting propellers, and friction-devices connected with said pendulum and adapted to govern the speed of said vertically-lifting propellers, said friction-devices including an endless drive, said vertically-lifting propellers being independently and conjointly operative.

In testimony that I claim the foregoing as my invention, I have hereunto set my hand in the presence of two subscribing witnesses at Ledyard, Iowa, this 7th day of September, 1909.

REINHOLD SCHMIECHEN.

Witnesses:
E. J. SKINNER,
C. V. TILLMONEY.